Figure 1:
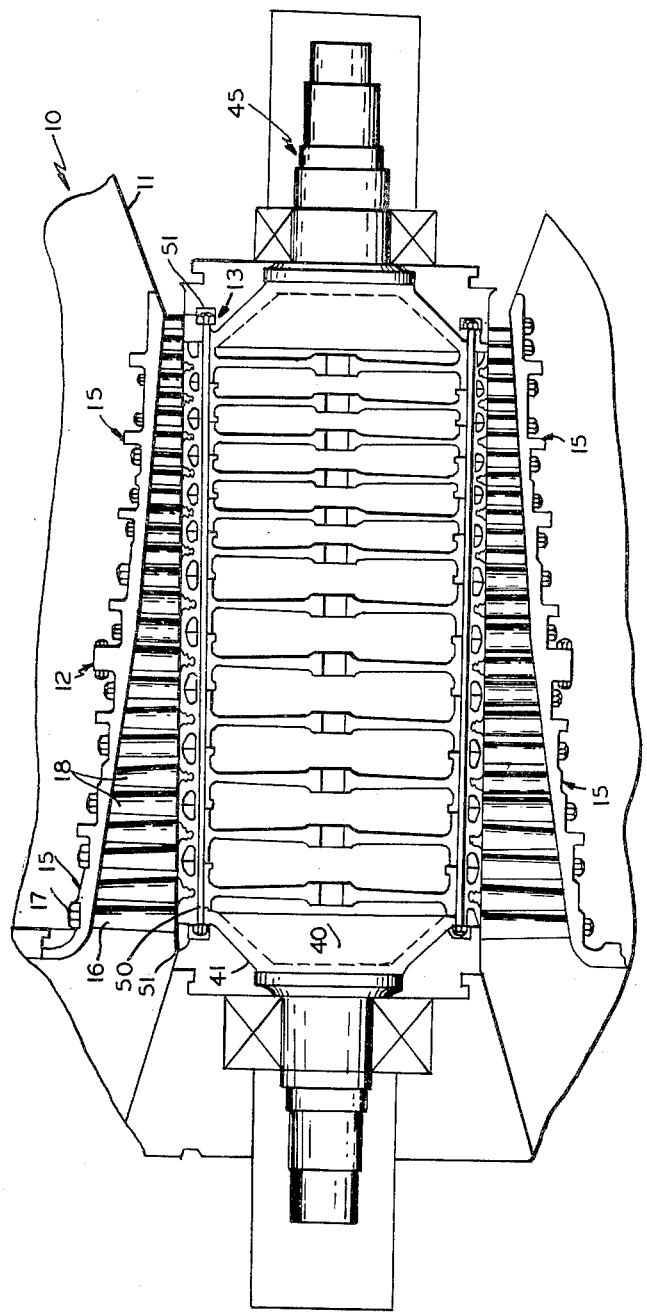

Oct. 23, 1962 W. A. SNOW ET AL 3,059,901
ROTOR CONSTRUCTION

Filed April 1, 1958

2 Sheets-Sheet 1

INVENTORS
WALTER A. SNOW
CLARENCE J. HORNBECK
BY
*Herman Seid*

ATTORNEY

Oct. 23, 1962 W. A. SNOW ET AL 3,059,901
ROTOR CONSTRUCTION
Filed April 1, 1958 2 Sheets-Sheet 2
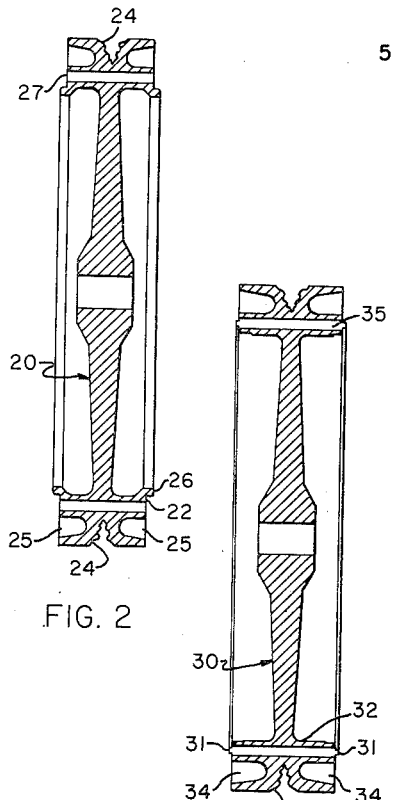
FIG. 2
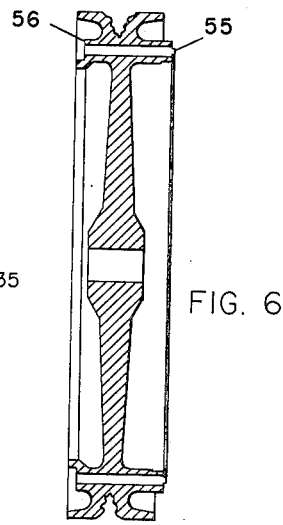
FIG. 3
FIG. 4
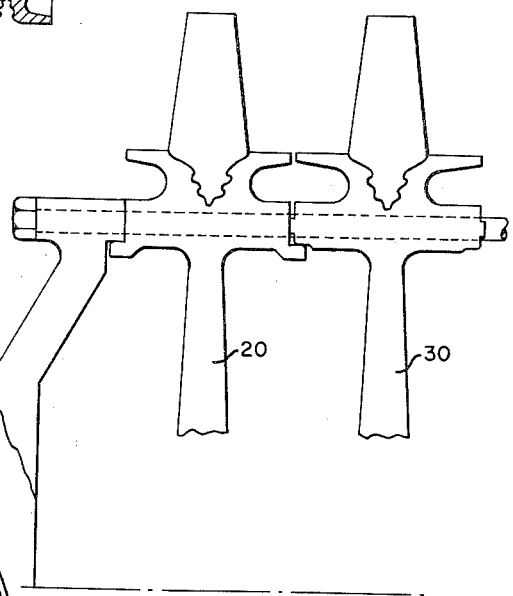
FIG. 6
FIG. 5
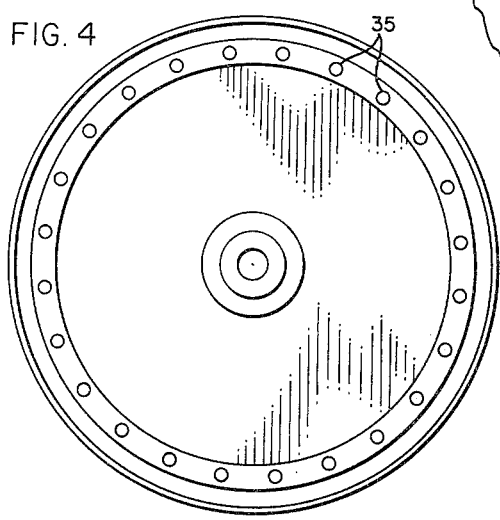
INVENTORS
WALTER A. SNOW
CLARENCE J. HORNBECK
BY Herman Seid
ATTORNEY

United States Patent Office 3,059,901
Patented Oct. 23, 1962

3,059,901
ROTOR CONSTRUCTION
Walter A. Snow and Clarence J. Hornbeck, Syracuse, N.Y., assignors to Carrier Corporation, Syracuse, N.Y., a corporation of Delaware
Filed Apr. 1, 1958, Ser. No. 725,664
4 Claims. (Cl. 253—69)

This invention relates to turbomachinery, and more particularly to a novel rotor construction for said machinery.

The term "turbomachinery" as here employed will be taken to designate all mechanisms having a rotating member in contact with a fluid, whether the mechanism is a driven mechanism such as a compressor, or whether a driving mechanism such as a turbine. The construction of the rotors of high speed turbomachinery engenders a variety of problems arising from the stresses present in the machinery during manufacture, and subsequent use. In order to provide desired operating conditions, it is generally necessary to carefully maintain manufacturing tolerances during production, and as in the case of all multicomponent structures, the components must be maintained in alignment during assembly and operation. Even with these carefully maintained manufacturing tolerances, the heat of the fluids passing through the machinery and the high rotational speed of the machinery components often result in distortions of these components which tend to interfere with the proper functioning thereof. It is thus desirable to provide means permitting the machinery components to be relatively self-adjusting both during assembly and in operation to compensate for any operating stresses and strains in the machine. It may be additionally desirable to minimize the weight of the components consistent with the strength requirements of the machine.

It with the above problems in mind that the present means have been evolved, means providing a novel rotor construction in which the components require a minimum of care in production, and which will be relatively self-adjusting in assembly and operation. The novel construction also provides for increased strength, with a reduction in weight if desired.

It is accordingly a primary object of this invention to provide a novel rotor in which the shape of the components aids in assembly and in maintaining the components in desired position during operation.

Another object of the invention is to provide a novel rotor construction in which costs of producing the component parts are minimized, without affecting operating efficiency.

An additional object of this invention is to provide rotor components in which the shape of the components facilitates assembly of the completed rotor.

It is a further object of this invention to increase the strength of the rotor assembly, at the same time permitting reduction of the weight of the components if desired.

A still further object of the invention is to provide a novel rotor structure in which the components are constrained to return to a desired operating position after local stressing beyond the yield point.

These and other objects of the invention, which will become apparent from the following disclosure and claims are achieved by provision of a novel rotor comprising a plurality of rotor wheels. Each of these rotor wheels is designed to support rotor blades adapted for arrangement between the stator blades of conventional turbomachinery. In a preferred embodiment of the invention as illustrated in connection with an axial flow compressor, one wheel is formed with a flat on each side thereof, and each adjacent wheel is formed with narrow pivot lands on opposite faces thereof. An external centering pilot in the form of a flange is provided on the rotor wheel having flats, and an internal pilot is provided on the rotor wheel having lands. The assembled rotor comprises a series of alternately placed rotor wheels having lands and flats respectively, with said wheels nesting one against the other, with the external pilot engaging in the internal pilot. The rotor wheels are then joined into a unitary construction by means of bolts passing therethrough at a radius spaced from the axis of rotation, through the pivot land, whereby torsion forces may be more readily resisted and the pivoting motion facilitated. An alternative embodiment is illustrated indicating how the inventive concept may be applied with a land and a flat on opposite faces of the same rotor component.

A primary feature of this invention is that the rotor components are so formed and interpositioned that forces acting on or within the rotor which tend to cause loss of contact of the centering pilots are attenuated.

Another feature of this invention is that a novel rotor construction is provided formed of a plurality of conjoined rotor wheels with a pilot flange on the rotor wheels which facilitates assembly and maintains the components in alignment during operation.

An additional important feature of the invention flows from the provision of a relatively thin pivot land as the interface contact between adjacent rotor wheels. This land forms an elastic hinge between components.

A further feature of the invention is the use of circumferentially spaced studs for joining the rotor wheels of a rotor into assembled relationship, thus increasing the strength of the rotor since resistance to torsion stresses on the rotor is through a relatively large lever arm as compared to that of the conventional splined axial shaft. The use of circumferentially spaced studs also permits elimination of an axial shaft extending through the rotor wheels, to reduce weight if desired, and eliminating cupping loads on wheels due to central clamping.

The specific constructional details of several embodiments of the invention and their mode of functioning will be made most manifest and particularly pointed out in the following description taken in conjunction with the accompanying drawings, wherein:

FIGURE 1 represents a cross sectional fragmentary view through an axial flow compressor showing how the novel rotor construction may be employed; and FIGURE 2 is a cross sectional detail view of rotor wheel having flats with an external centering pilot formed thereon; and FIGURE 3 is a cross sectional detail view of rotor wheel having pivot lands and internal pilot thereon; and FIGURE 4 is a plan view of the pivot land rotor wheel of FIGURE 3; and FIGURE 5 is a fragmentary view illustrating the engagement between the rotor wheels shown in FIGURES 2 and 3; and FIGURE 6 is a cross sectional detail view of a modified rotor wheel illustrating the invention.

Referring now more particularly to the drawings, like numerals in the various figures will be taken to designate like parts.

The invention is here illustrated as embodied in the rotor of an axial flow compresser, as illustrated in FIGURE 1. The compressor 10 comprises a casing assembly 11, a stator assembly 12, and a rotor assembly 13.

Rotor assembly 13, as best seen in FIGURE 1, comprises a plurality of rotor wheels secured together between conical portions of a pair of stub shafts. The rotor wheels illustrated in the embodiment of the invention illustrated in FIGURES 1–5 are of two types: a rotor wheel having pivot lands and internal pilots, and a rotor wheel having flats and external pilots. Hereafter these rotor wheels will be referred to respectively as land rotor wheel 30 and flat rotor wheel 20.

The flat rotor wheel 20 is formed of a disk shape having an annular rim portion 22 of a thickness greater than that of a central portion of said wheel, as best seen in FIGURE 2. The rim 22 is provided with a blade root engaging keyway 24 for rotor blades 18. An undercut portion 25 surrounding the keyway may be employed to reduce the weight of the rotor wheel. An external pilot flange 26 is formed on the inner part of rim 22, adapted to securely seat and maintain the mating internally piloted adjacent member. A plurality of circumferentially spaced bolt holes 27 is provided through the rim inwardly of blade root keyway 24, said holes permitting a stud to pass therethrough, as will become hereinafter more apparent.

The land rotor wheel 30, best seen in FIGURE 3, is designed for nesting with flat rotor wheel 20. Relatively thin pivot lands 31 are formed on the rim 32 of wheel 30. As in the flat rotor wheel 20, the rim 32 is thicker than the central portion of the wheel. A blade root engaging keyway 33 is formed in this rim 32, and undercut portion 34 similar to undercut 25 may be formed for reducing wheel weight. Bolt holes 35 spaced to coincide with bolt holes 27 are arranged about the rim, as best seen in FIGURE 4. These holes 35 extend through land 31.

Inboard stub shaft 40 is formed with appropriate journal surfaces to receive the bearings, seals and jacking gear. The portion of the stub shaft 40 adjacent the rotor wheels is formed in the shape of a frustrum of a cone 41, and is formed with circumferentially spaced bolt holes 42 extending about the base of section 41.

Outward stub shaft 45, as seen in FIGURE 1, is formed with a journal to receive a thrust bearing and appropriate seals and jacking gear (not forming part of this invention). A cone 46 is formed adjacent the rotor wheels and is provided with a plurality of circumferentially spaced bolt holes 47 aligned with the bolt holes 27 and 35 respectively, of the rotor wheels.

The rotor is assembled by passing studs 50 through the bolt holes of the stub shafts and the rotor wheels and securing nuts 51 at the free ends of the studs.

In the embodiment of the invention illustrated in FIGURE 6, a single rotor wheel is shown having a pivot land 55 on one face of the rim, and a flat 56 on the opposite face of the rim. In assembled relationship, adjacent rotor wheels are arranged so that the pivot land 55 of one wheel nests on the flat 56 of the adjacent rotor wheel. Any wheel, however, has either internal or external pilots. Circumferentially spaced bolt holes are similarly provided in this embodiment to permit assembly of the rotor wheels into the rotor.

It will be noted that contact between any adjacent components is limited to the narrow pivot lands and the centering pilots. All other surfaces are relieved to provide clearance for the minute motions necessary to the performance of the assembled rotor.

Operation

The aforedisclosed rotor construction is arranged in assembled relationship with the other components of the axial flow compressor 10 as illustrated in FIGURE 1.

In operation the rotor rotates about its axis driven by a suitable drive such as a turbine, internal combustion engine, electric motor or the like.

Assembly of the rotor is accomplished by positioning the requisite number of rotor wheels between the stub shafts, a land rotor wheel 30 being alternated with a flat rotor wheel 20, with land 31 of land wheel 30 contacting the flat face of flat wheel 20, forming an elastic hinge between the rotor wheels. The term "elastic hinge" is here employed to designate a connection between two or more members which constrains said members to return to an initial position after removal of any distorting stress while providing a pivoting action without sliding of contacting surfaces. As seen in the drawings alternate rotor wheels are provided with external pilots, one on each face of said rotor wheels. These external pilots are shown in FIGURES 1–5 as formed on the flat rotor wheels 20, but may within the scope of this invention also be formed on the land rotor wheels. The rotor wheels between the externally piloted rotor wheels are provided with internal pilots within which said external pilots may seat. Inboard stub shaft 40 is provided in the illustrated embodiment shown in FIGURE 2 with an internal pilot for engagement with the externally piloted rotor wheel at the inboard end of the rotor. The inboard stub shaft 40 is engaged with this inboard rotor wheel by an interference fit between the pilots whereby the flange of the rotor wheel is slightly pre-stressed. This pre-stressing is transmitted through the rotor wheels via the respective pilots as seen in the drawing to outboard stub shaft 45 which is formed with an external pilot.

The flexibilities of the assembly are so adjusted that changes of rotational speed and temperature within the range for which the rotor is designed do not cause the centering pilots to become loose; i.e., an interference fit is maintained between the pilots. Motion between the rotor wheels is permitted through the low resistance elastic hinge formed between the lands 31 and the flats of the rotor wheels adjacent to said land wheels. The relative elastic stiffness of the rims and discs of the rotor wheels is such that the deflection produced on the outboard side by a radial load on the piloting flange on the inboard side is less than, and of opposite direction to the deflection on the inboard side of the wheel, and vice versa. This establishes an elastic system in which changes of the interference pressure on the centering pilots of any wheel will be attenuated. These changes in interference pressure are produced by manufacturing tolerances and assembly techniques, changes of speed during operation, changes of temperature during operation, changes of blade length along the rotor, etc.

The wheels are secured together to form the assembled rotor by means of studs 50. These circumferentially spaced studs provide torsional rigidity for the assembled rotor, since in operation, forces tending to twist the rotor out of alignment are countered by forces having a relatively larger lever arm as measured from the axis of rotation, rather than by the conventional axial shaft having a relatively small lever arm between the spline and the axis of rotation. The elimination of this axial shaft also serves to permit reduction of the weight of the rotor if desired.

Any forces tending to twist one rotor component relative to the other about the axis of rotation are resisted by the shear strength of the studs, the frictional forces between the components at the pivot land, and the frictional forces between the pilot. Any forces tending to move a given component off center are resisted by the pilots.

To further describe the invention, consider for illustration the operation of the apparatus with reference to the action caused by a force actuated physical displacement of the kind due to centrifugal force or thermal gradients. If it is to be assumed that the force is localized at one end of one of the rotor wheels and tends to impart a clockwise movement to the wheel, then an opposing counterclockwise movement is induced in the next wheel, movement occurring about the elastic hinges. This in turn creates a tendency in the succeeding wheel toward clockwise movement, and so on. Thus, the desired attenuation of the movement occurs.

It is thus seen that a novel rotor construction has been provided, in which lands are formed on the rim of the component rotor wheels which serve to facilitate assembly by acting as pilots to secure proper alignment of the component wheels, and in which these pilots further serve to maintain the components in alignment during operation of the turbomachinery of which said rotor forms a part.

This alignment is achieved by a balance of elastic flexibilities. The rotor wheel components are secured together by means of a plurality of circumferentially spaced bolts, which provide resistance to torsional deflection and clamp the components together through the elastic hinges. This is due to the increased lever arm of the counter torque exerted by said connecting studs, and the reduced weight of the assembled rotor. Resistance to lateral displacement of the rotor components during rotation is provided by the pilots which constrain the wheels into alignment even through the disc center portions are stressed beyond the yield point. Maintenance of the true centered position of the components is facilitated by the elastic hinge formed by the pivot lands.

The above disclosure has been given by way of illustration and elucidation, and not by way of limitation, and it is desired to protect all embodiments of the herein disclosed inventive concept within the scope of the appended claims.

We claim:

1. In turbomachinery having a plurality of stator blades, and a plurality of rotor blades, each one of said plurality of rotor blades alternately positioned between two adjacent stator blades, a rotor assembly comprising: a flat rotor wheel having an annular rim portion of a thickness greater than that of a central portion of said wheel; a flat formed on the rim portion; a flange on the inner part of the rim portion forming an external pilot on said rim portion, said external pilot resisting lateral movement of said wheel; a land rotor wheel having a rim portion of a thickness greater than that of the central portion of said wheel; a relatively thin pivot land on the rim of said land rotor wheel adapted to effect the only contact with the flat of said flat wheel; connected together by a plurality of circumferentially spaced studs passing through said land, whereby said flat and land rotor wheels are connected by an elastic hinge.

2. In turbomachinery having a plurality of stator blades, and a plurality of rotor blades, each one of said plurality of rotor blades alternately positioned between two adjacent stator blades, a rotor assembly comprising: a flat rotor wheel having a rim portion of a thickness greater than that of a central portion of said wheel; a flat on the rim portion; a flange on the rim portion forming an external pilot, said flange resisting lateral movement of said wheel; a land rotor wheel having a rim portion of a thickness greater than that of the central portion of said wheel; a relatively thin pivot land on the rim of said land rotor wheel adapted to seat on the flat of said flat wheel, whereby an elastic hinge is formed between said rotor wheels; an inboard stub shaft having a cone adapted for securement to one end of said nested rotor wheels; an outboard stub shaft having a cone adapted for securement to the other end of said nested rotor wheels; and a stud extending through said rotor wheels and said cones for maintaining same in assembled relationship.

3. A rotor for use in a turbomachine comprising a first series of blade mounting wheels having an outer annular section, provided with a relatively flat surface terminating in an externally extending pilot at each axial end thereof, and a second series of blade mounting wheels having an outer annular section provided with axial projections on opposed axial end surfaces having relieved portions such that upon assembly of the wheels in a pattern which includes wheels of the second series interposed between wheels of the first series with the projections on the second wheel engaging the flat surfaces of opposing wheels and the external pilot engaging the relieved portions, limited pivotal movement between adjoining wheels may occur.

4. A rotor for use in a turbomachine comprising a plurality of wheels each having an outer annular blade mounting section, one axial end portion of each of said wheels being provided with a relatively flat surface and a projecting pilot and the opposed axial end portion of which is provided with a projection such that upon assembly of the wheels the projection engages the flat surface on the adjoining wheels to enable limited pivotal action between adjoining wheels to occur accompanied by engagement of the pilot with the said adjoining wheel and means uniting the wheels to form a unitary rotor structure.

References Cited in the file of this patent

UNITED STATES PATENTS

| | | |
|---|---|---|
| 2,392,281 | Allen | Jan. 1, 1946 |
| 2,461,402 | Whitehead | Feb. 8, 1949 |
| 2,501,038 | Fransson | Mar. 21, 1950 |
| 2,579,583 | Johnson | Dec. 25, 1951 |
| 2,603,453 | Sollinger | July 15, 1952 |
| 2,610,786 | Howard | Sept. 16, 1952 |
| 2,650,017 | Pedersen et al. | Aug. 25, 1953 |
| 2,711,304 | Mitchell | June 21, 1955 |
| 2,807,434 | Zimmerman | Sept. 24, 1957 |
| 2,841,362 | Yeomans | July 1, 1958 |

UNITED STATES PATENT OFFICE

CERTIFICATE OF CORRECTION

Patent No. 3,059,901                                           October 23, 1962

Walter A. Snow et al.

It is hereby certified that error appears in the above numbered patent requiring correction and that the said Letters Patent should read as corrected below.

Column 4, line 44, for "larger" read -- large --; column 6, line 20, for "pilot" read -- pilots --.

Signed and sealed this 26th day of March 1963.

(SEAL)
Attest:

ESTON G. JOHNSON
Attesting Officer

DAVID L. LADD
Commissioner of Patents